US008666783B1

(12) United States Patent
Meyer

(10) Patent No.: US 8,666,783 B1
(45) Date of Patent: Mar. 4, 2014

(54) METHODS AND SYSTEMS FOR STABILIZING REVENUE DERIVED FROM VARIABLE ANNUITIES REGARDLESS OF MARKET CONDITIONS

(75) Inventor: John R. Meyer, Staten Island, NY (US)

(73) Assignee: New York Life Insurance Company, New York, NY (US)

( * ) Notice: Subject to any disclaimer, the term of this patent is extended or adjusted under 35 U.S.C. 154(b) by 2933 days.

(21) Appl. No.: 10/661,346

(22) Filed: Sep. 12, 2003

Related U.S. Application Data

(60) Provisional application No. 60/411,183, filed on Sep. 16, 2002.

(51) Int. Cl.
G06Q 40/00 (2012.01)

(52) U.S. Cl.
USPC .............................................. 705/4

(58) Field of Classification Search
USPC .............................................. 705/4
See application file for complete search history.

(56) References Cited

U.S. PATENT DOCUMENTS

| 3,634,669 | A | 1/1972 | Soumas et al. |
| 4,566,066 | A | 1/1986 | Towers |
| 4,722,055 | A | 1/1988 | Roberts |
| 4,989,141 | A | 1/1991 | Lyons et al. |
| 5,132,899 | A | 7/1992 | Fox |
| 5,185,696 | A | 2/1993 | Yoshino et al. |
| 5,231,571 | A | 7/1993 | D'Agostino |
| 5,479,344 | A | 12/1995 | Keziah, Jr. |
| 5,502,637 | A | 3/1996 | Beaulieu et al. |
| 5,523,942 | A | 6/1996 | Tyler et al. |
| 5,590,037 | A | 12/1996 | Ryan et al. |
| 5,689,649 | A | 11/1997 | Altman et al. |
| 5,712,984 | A | 1/1998 | Hammond et al. |
| 5,752,236 | A | 5/1998 | Sexton et al. |
| 5,754,980 | A | 5/1998 | Anderson et al. |
| 5,761,645 | A | 6/1998 | Hawkins |

(Continued)

FOREIGN PATENT DOCUMENTS

| JP | 10228509 A | 8/1998 |
| WO | WO 01/50306 | 7/2001 |

(Continued)

OTHER PUBLICATIONS

National Association of Insurance Commisssioners, "Buyers Guide to Fixed Deferred Annuities with Appendix for Equity-Indexed Annuities", 1999.*

(Continued)

Primary Examiner — Neal Sereboff
(74) Attorney, Agent, or Firm — Ostrow Kaufman LLP

(57) ABSTRACT

The present invention provides methods and systems for stabilizing revenue derived by a variable annuity provider from variable annuities having a mortality and expense fee computed based on at least one variable that is not directly affected by market conditions, e.g., the annuity premium or a portion thereof, such as the premium that has been paid, or the premium that has been paid and invested in one or more investment divisions available to an annuity owner. The mortality and expense fee may also account for any withdrawals paid out of and disbursements made from the premium paid accordingly. The mortality and expense fee generally funds at least in part a risk associated with an annuity death benefit, such as a return of premium that has been paid death benefit.

14 Claims, 2 Drawing Sheets

(56) References Cited

U.S. PATENT DOCUMENTS

| | | | |
|---|---|---|---|
| 5,784,696 A | 7/1998 | Melnikoff | |
| 5,799,287 A | 8/1998 | Dembo | |
| 5,806,047 A | 9/1998 | Hackel et al. | |
| 5,812,987 A | 9/1998 | Luskin et al. | |
| 5,819,230 A | 10/1998 | Christie et al. | |
| 5,864,828 A | 1/1999 | Atkins | |
| 5,893,071 A | 4/1999 | Cooperstein | |
| 5,918,217 A | 6/1999 | Maggioncalda et al. | |
| 5,926,792 A * | 7/1999 | Koppes et al. | 705/4 |
| 5,933,815 A | 8/1999 | Golden | |
| 5,956,691 A | 9/1999 | Powers | |
| 5,978,778 A | 11/1999 | O'Shaughnessy | |
| 5,991,733 A | 11/1999 | Aleia et al. | |
| 5,991,740 A | 11/1999 | Messer | |
| 5,999,929 A | 12/1999 | Goodman | |
| 6,012,044 A | 1/2000 | Maggioncalda et al. | |
| 6,014,632 A | 1/2000 | Gamble et al. | |
| 6,021,397 A | 2/2000 | Jones et al. | |
| 6,026,364 A | 2/2000 | Whitworth | |
| 6,055,517 A | 4/2000 | Friend et al. | |
| 6,064,969 A | 5/2000 | Haskins | |
| 6,275,807 B1 * | 8/2001 | Schirripa | 705/36 R |
| 6,456,979 B1 * | 9/2002 | Flagg | 705/4 |
| 6,611,815 B1 * | 8/2003 | Lewis et al. | 705/36 R |
| 7,016,871 B1 * | 3/2006 | Fisher et al. | 705/35 |
| 7,251,623 B1 * | 7/2007 | Ryan et al. | 705/35 |
| 2002/0169715 A1 | 11/2002 | Ruth et al. | |
| 2002/0184129 A1 * | 12/2002 | Arena et al. | 705/35 |
| 2002/0198802 A1 * | 12/2002 | Koresko, V | 705/35 |
| 2003/0004844 A1 | 1/2003 | Hueler | |
| 2003/0028466 A1 | 2/2003 | Jenson et al. | |
| 2003/0088430 A1 * | 5/2003 | Ruark | 705/1 |
| 2003/0088444 A1 * | 5/2003 | Garbin et al. | 705/4 |
| 2003/0110061 A1 * | 6/2003 | Lakenbach et al. | 705/4 |
| 2003/0126053 A1 | 7/2003 | Boswell et al. | |
| 2003/0144888 A1 | 7/2003 | Baron et al. | |

FOREIGN PATENT DOCUMENTS

| | | |
|---|---|---|
| WO | WO 01/69504 | 9/2001 |
| WO | WO 01/75557 A2 | 10/2001 |
| WO | WO 02/13118 A1 | 1/2002 |
| WO | WO 02/15457 | 2/2002 |
| WO | WO 02/35363 A1 | 5/2002 |
| WO | WO 03/012594 A2 | 2/2003 |
| WO | WO 03/058378 A2 | 7/2003 |

OTHER PUBLICATIONS

Gender (2007) The Penguin English Dictionary. London: Penguin.*

Milevsky et al., "The titanic Option: Valuation of the Guaranteed Minimum Death Benefit in Variable Annuities and Mutual Funds." Journal of Risk and Insurance—Mar. 1, 2001.*

Mudavanhu et al., "Valuing guaranteed minimum death benefits in variable annuities and the option to lapse." Mar. 2002.*

Milevsky et al, "The Titanic Option: Valuation of the guaranteed minimum death benefit in variable annuities and mutual funds." Journal of Risk and Insurance, Mar. 1, 2001.*

National Association of Insurance Commissioners, "Buyers guide to fixed deferred annuities with appendix for equity-indexed annuities" 1999.*

Mudavanhu et al., "Valuing guaranteed minimum death benefits in variable annuities and the options to lapse" Mar. 2002.*

Anonymous. "A Shopper's Guide to Long-Term Care Insurance," National Association of Insurance Commissioners, 1999, 45 pages.

Black, Kenneth Jr. and Harold D. Skipper, Jr. *Life Insurance* $12^{th}$ Ed., Englewood Cliffs, NJ, Prentice-Hall, Inc. 1994, Chapters 7, 10 and 13.

Brown, Bruce. "KSH-2 Financial Calculator 1.6," *PC Week*, vol. 8, No. 31, Aug. 5, 1991, p. 78.

DeSimone, Marcella. "Early Enrollment Period Begins for Federal LTCI Program," *National Underwriter*, Apr. 1, 2002, vol. 106, No. 13, p. 40.

English, David. "Get Rich Quick," *Comput*, vol. 16, No. 98, Sep. 1994, p. 38.

Feldman, Saul. "Wealthbuilder 2.0," *Macworld*, vol. 10, No. 5, May 1993, p. 146.

Granza et al. "Financing Long-Term Care: Employee Needs and Attitudes, and the Employer's Role," International Society of Certified Employee Benefits Specials 1998 Benefits Quarterly, vol. 14, No. 4, pp. 60-72.

Iglehart, Mark. "Don't Gamble when Planning for Long-Term Care," *The National Public Accountant*, Apr. 2001, vol. 46, No. 2, p. 11, 2 pgs.

Iverson, Wesley. "From Desktop to the Web," *Financial Service ONLINE*, Mar. 1999, p. 42+.

*Journal of Commerce*, "Life Before Death," Jun. 19, 1990, 2 pgs.

Kerry, Mark E. "Whole Life & an LTC Rider: One Solution to the Long-Term Care Dilemma," *Life Association News*, vol. 86, No. 7, Jul. 1991, pp. 71-75.

Poglianich, Antonio. "Life Care Communities: Evaluating a Promising Retirement Alternative," *Journal of the Institute of Certified Financial Planners*, vol. 9, No. 1, Spring 1988, pp. 29-34.

Pullman, Liz. "Personal Finance: CPAs Compute Pluses, Minuses of New Law Allowing Commissions," *Los Angeles Times*, Nov. 21, 1998.

Shipley, Chris. "12 Best Financial-Software Packages," *Working Woman*, vol. 18, No. 2, Feb. 1993, pp. 42-43.

TIAA-CREF Web Center. "Optional Long-Term Care Benefits," http://web.archive.org/web/20020210171521/http://www.tiaa-cref.org . . . , retrieved Apr. 7, 2005.

Ware, Robert C. "Medicare and Medicaid," *Life and Health Insurance Sales*, vol. 135, No. 11, Nov. 1992, pp. 28-30.

* cited by examiner

METHODS AND SYSTEMS FOR STABILIZING REVENUE DERIVED FROM VARIABLE ANNUITIES REGARDLESS OF MARKET CONDITIONS

This application claims priority from U.S. Provisional Application No. 60/411,183, entitled "METHODS AND SYSTEMS FOR STABILIZING REVENUE DERIVED FROM VARIABLE ANNUITIES REGARDLESS OF MARKET CONDITIONS," filed Sep. 16, 2002, which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to methods and systems for stabilizing revenue derived by a variable annuity provider from variable annuities. More particularly, the present invention relates to methods and systems for providing variable annuities having death benefits funded or covered with Mortality and Expense ("M&E") fees.

Variable annuities are generally contracts offered by a financial organization, such as an insurance company, which provide periodic annuity payments or a lump sum payment to the annuitant, such as the variably annuity contract owner, that begin at a predetermined or specified date. The term "variable annuity contract owner" or the "annuity owner" is used herein to denote a person that makes decisions regarding the annuity's investments, and have contractual rights, for example, to make withdrawals from the annuity, surrender, change the designated beneficiary or other terms of the annuity, etc. The annuity owner purchases a variable annuity by paying one or more premiums and the premiums may be deposited directly into a fixed account and/or investment divisions within the policy. The investment divisions, which provide the variable aspect of the annuity, are typically tracked in a separate account.

Variable annuities also typically provide death benefits that provide, for example, the return of the premium that has been paid (or cash value, if higher) in the event the annuitant dies before commencement of annuity payments to the annuitant or a third party. The risk assumed by the annuity provider in association with the death benefits is typically funded or covered at least in part with a M&E, assessed against the annuity, that is based on the value of the annuity investments, e.g., the value of the average daily balance in the separate investment divisions or accounts.

The investment account-based M&E fee and the revenue derived from the M&E fee, for instance, is largely dependent on the investments selected by the annuity owner and may consequently fluctuate with market conditions. The term "market conditions" is used herein as a general term to denote the overall economic environment or state of one or more markets, e.g., stock, bond, commodity, future, funds, etc., at any given time that may be reflected in the performance of investments or investment options available to annuity owners. The M&E fee and the revenue derived therefrom are therefore unpredictable.

Furthermore, in certain instances the M&E fee may not properly reflect the risk assumed by the company providing the variable annuity. For example, the provider may, in a declining market, be subject to a risk that is disproportionately higher than the revenue derived from the investment account-based M&E fee. There is therefore a need for methods and systems that, with respect to variable annuities, provide a level or stable M&E fee and consequently a level or stable revenue stream derived from M&E fees.

SUMMARY OF THE INVENTION

In one aspect of the present invention, a method for stabilizing revenue derived by a variable annuity provider from variable annuities is provided that includes the steps of offering a variable annuity at a premium, the variable annuity having a mortality and expense fee computed based on at least one variable that is not directly affected by market conditions, and using the mortality and expense fee to fund at least in part a risk associated with a death benefit for the variable annuity. The mortality and expense fee may be computed based on a variable that is proportional to the risk assumed with the annuity death benefit.

A variable annuity owner is generally able to invest at least a portion of the annuity premium, such as the premium that has been paid, in one or more available investment divisions. In one embodiment, the mortality and expense fee is computed based on at least one variable independent of the value of the investments. In another embodiment, the variable annuity offered has a mortality and expense fee computed based on at least a portion of the premium. The mortality and expense fee may, for instance, be computed based on at least a portion of the premium that has been paid. The mortality and expense fee may also be computed based on a portion of the premium that has been paid and that has been invested in one or more of the investment divisions. Moreover, the mortality and expense fee may be computed based on the premium that has been paid also accounting for any withdrawals paid out of and disbursements made from the paid premium.

In one embodiment, the mortality and expense fee is assessed periodically at a fixed rate. For instance, the mortality and expense fee may be assessed at a mode determined by the variable annuity provided (e.g. monthly, quarterly or annually) at a fixed annual rate. In another embodiment, the death benefit provides a return of the premium that has been paid or a variable annuity cash value, e.g., the accumulated value, if the cash value is greater than the premium that has been paid in the event an annuitant dies before commencement of annuity payments. The variable annuity may also be offered with a guaranteed minimum death benefit rider that provides a death benefit selected from a group consisting of an annual reset, the greater of the annual reset, the premium that has been paid, and a variable annuity cash value.

In another aspect of the present invention, a method for stabilizing revenue derived by a variable annuity provider from variable annuities is provided that includes the steps of offering a variable annuity at a premium, the variable annuity having a mortality and expense fee computed based on at least a portion of the premium that has been paid, accounting for any withdrawals and disbursements from the paid premium, and using the mortality and expense fee to fund at least in part a risk associated with a death benefit for the variable annuity.

In another aspect of the present invention, a method for stabilizing revenue derived by a variable annuity provider from variable annuities is provided that includes the steps of offering a variable annuity which allows an annuity owner to invest at least a portion of the premium in one or more investment divisions, the variable annuity having a mortality and expense fee computed based on a portion of the premium that has been paid and that has been invested in one or more investment divisions, and using the mortality and expense fee to fund at least in part a risk associated with a death benefit for the annuity.

In another aspect of the present invention, a method for stabilizing revenue derived by a variable annuity provider from variable annuities is provided that includes the steps of computing a mortality and expense fee based on at least one variable that is not directly affected by market conditions, assessing the computed mortality and expense fee against an annuity account, and applying the assessed mortality and expense fee to cover a death benefit for a variable annuity. In one embodiment, the mortality and expense fee is computed based on at least a portion of an annuity premium. In another embodiment, the mortality and expense fee is computed based on at least a portion of an annuity premium that has been paid. In another embodiment, the mortality and expense fee is computed based on at least a portion of the annuity premium that has been paid and that has been invested in one or more investment divisions.

In another aspect of the present invention, a method for stabilizing revenue derived by a variable annuity provider from variable annuities is provided that includes the steps of assessing a mortality and expense fee against at least one variable annuity account, the mortality and expense fee computed based on at least one variable that is not directly affected by market conditions, and using the mortality and expense fee to fund at least in part a risk associated with a death benefit for variable annuities. In one embodiment, the mortality and expense fee is computed based on at least a portion of an annuity premium that has been paid. The mortality and expense fee may, for instance, be computed based on a portion of the annuity premium that has been paid and that has been invested in one or more investment divisions, and may account for any withdrawals paid out of and disbursements made from the paid annuity premium. In one embodiment, the mortality and expense fee is assessed periodically at a fixed rate.

In another aspect, the present invention provides a method for stabilizing revenue derived by a variable annuity provider from variable annuities that includes the steps of assessing a mortality and expense fee against at least one variable annuity account, the mortality and expense fee computed based on at least a portion of an annuity premium that has been paid, and using the mortality and expense fee to fund at least in part a risk associated with a death benefit for variable annuities.

In another aspect the present invention provides a method for stabilizing revenue derived by a variable annuity provider from variable annuities that includes the steps of assessing a mortality and expense fee against the premium invested in at least one variable annuity account, the mortality and expense fee computed based on at least a portion of an annuity premium that has been paid and that has been invested in one or more investment divisions available to an annuity owner for investing at least a portion of the annuity premium, accounting for any withdrawals and disbursements from the paid premium, and using the mortality and expense fee to fund at least in part a risk associated with a death benefit for variable annuities.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

The present invention provides systems and methods that overcome some or all of the drawbacks associated with investment account-based mortality and expense ("M&E") fees, by providing variable annuities with an essentially stable M&E fee and consequently a stable revenue stream derived therefrom by the annuity provider. This aspect of the invention is generally accomplished with variable annuities having M&E fees computed based on at least one variable that is not directly affected by market conditions. In one embodiment, the M&E fee is computed based at least partially on the portion of the premium that has been deposited into the investment divisions of the policy, such as the assessment date of the M&E fee, which may be at the anniversary of the annuity or fractions thereof, e.g., semiannually, quarterly, etc. In another embodiment, the M&E fee is computed based on a portion of the value of the premium that has been paid and that has been invested in one or more investment divisions available to an annuity owner. The term "investment divisions" is used herein to denote investment divisions contained in the variable annuity contract, exclusive of the fixed account.

The M&E fee and the revenue derived therefrom are therefore essentially stable and predictable since, for instance, the annuity owner either pays the premium in a lump sum or in periodic premium payments over the accumulation period. The accumulation period is the period of time within which the annuity owner makes premium payments. The accumulation period typically begins from the inception of the annuity and ends when annuity payments to the annuitant begin. Additionally, at least with respect to premium based M&E fees, the M&E fee and the revenue derived therefrom correspond or are proportional to the risk associated with the particular death benefit funded at least in part with the M&E fee. Although the death benefit funded with the M&E fee, by way of example, may be a return of the premium that has been paid death benefit, it is understood that various death benefits may be funded with an M&E fee and is therefore not limited thereto. For example, the death benefit may be the variable annuity's cash value in the event the cash value, e.g., the accumulated value, is greater than the premium paid.

Figure 1:
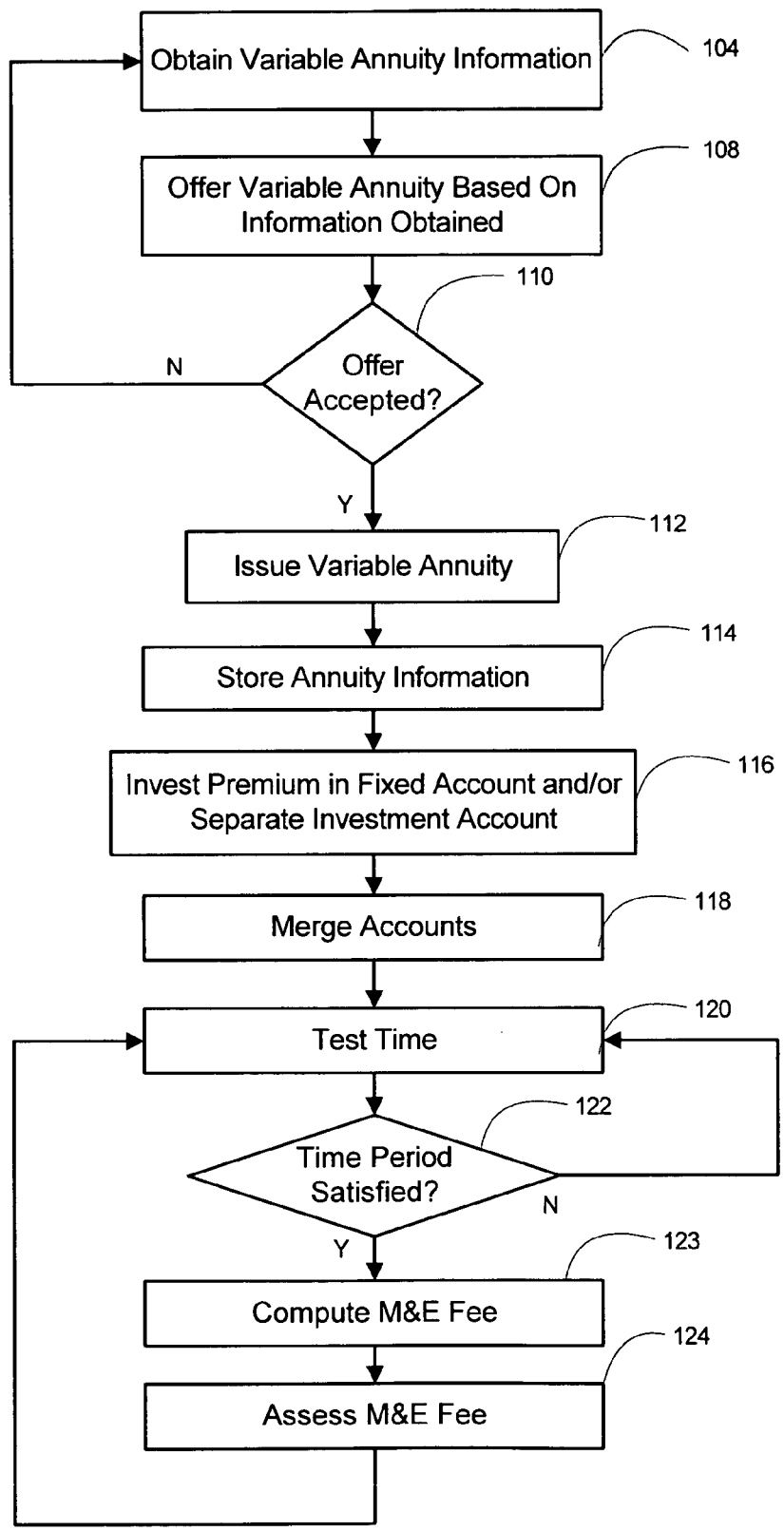
FIG. 1 is a flowchart of a method for stabilizing revenue derived by a variable annuity provider from variable annuities according to one embodiment of the present invention.

Referring to FIG. 1, a method for stabilizing revenue derived by a variable annuity provider from variable annuities, according to one embodiment of the present invention, begins by obtaining, from an individual, relevant or necessary information to provide for the particular individual a variable annuity, step 104. Relevant information may include the individual's personal information, such as identification, age, age or date at which the individual would like annuity payments to commence, the period of time over which the annuity payments continue, e.g., lump sum, years, life, etc., desired death benefit options, etc. In certain instances, certain terms may be dictated by the provider, such as the payout terms, limitations, etc.

An individual may purchase a variable annuity by specifying the amount or the premium the individual is willing to invest. Thus, in these instances, the step of obtaining relevant information includes obtaining information regarding the amount the individual is willing to invest.

A variable annuity having a death benefit funded at least in part with M&E fees computed based on at least one variable that is not directly affected by market conditions may then be offered to the individual based on at least one or a plurality of items of information obtained or computed, step 108. The variable not directly affected by market conditions may be, for instance, a variable independent of the value of the annuity investments, such as a fee based on the annuitant's age at the inception of the annuity or at the payout date, life expectancy, gender, or a combination thereof, in which instance the fee may be a constant fee or increase throughout the accumulation period, for example, to reflect the higher mortality risk as the annuitant ages. For example, the M&E fee may be a constant $100 assessed quarterly throughout the accumulation period, or may vary, increasing from $50 assessed quarterly for the first year of the accumulation period to $150 assessed quarterly in the final year of the accumulation period.

The M&E fee may also be a premium based fee that is computed based at least partially on the value of the annuity premium that has been paid as of or up to a predetermined date or a portion thereof, the premium paid accounting for any withdrawals or disbursements from the paid premium, etc. A portion of the premium paid may be the amount of the premium that has been paid and that has been invested in one or more investment divisions or tracked in an investment division or account. For example, assuming an annuity premium of $50,000, an M&E fee based on the value of the annuity premium may be a percentage of the $50,000 premium fixed, e.g., 0.1%, 0.2%, 0.3%, 0.4%, etc. or variable through the accumulation period. Assuming the premium that has paid as of the $3^{rd}$ anniversary is $20,000, the M&E fee based on the premium that has been paid as of the $3^{rd}$ anniversary may be a percentage (fixed or variable rate) of the $20,000. Further assuming that of the $20,000 premium that has been paid, only $15,000 was invested in one or more investment divisions or separate accounts, the M&E fee based on a portion of the premium paid may be a percentage of the $15,000.

Alternatively or in addition, the variable annuity includes M&E fees computed based on at least one variable, which corresponds to the risk posed by the particular death benefit provided with the variable annuities, such as, in the instance the death benefit is a return of premium death benefit, the premium that has been paid, or a portion thereof. In one embodiment, the M&E fee is based at least in part on the premium or a portion thereof and is assessed periodically at a fixed annual rate, such as at a rate of about 1% to about 3% annually (1.25% to 0.0.75% quarterly), or at about 1.50% to about 1.70% annually (0.325% to 0.425% quarterly). In one embodiment, the M&E fee is assessed at about 1.70% annual (0.425% quarterly) fixed rate. The fixed rate may account for the total risk associated with the death benefit or may account for at least a portion of the risk, and may include charges for administrative services.

In certain instances, at least one of a plurality of the variable annuity features, including the M&E fee rate, is adjusted to account or reflect a desired profit for the annuity provider from variable annuities or to generate a revenue stream that may be required for the annuity provider to offer the variable annuities. The desired profitability and revenue may be assumed based on the business judgment of the annuity provider, statistical analysis, or a combination thereof.

The premium based M&E fee variable annuities may also be provided with guaranteed minimum death benefit (GMDB) riders, which offer greater death benefits or features than the return of the premium paid death benefit. In one embodiment, the GMDB rider offers death benefits that include an annual reset, the greater of an annual reset and the premium paid, and a variable annuity's cash value, each with or without a rollup. An annual reset generally periodically resets the amount that may be returned in the event the annuitant dies to the value of the annuity, such as at the anniversary of the annuity. The greater of an annual reset and the paid premium with or without a rollup generally provides that the annual reset will not be reset below the amount of the premium that has been paid, with or without an interest rate applied, e.g., 5% per year. The variable annuity's cash value rider generally provides a death benefit that is equal to the value of the variable annuity when the annuitant dies, which may be the accumulated value as of the annuitant's death or a predetermined value. In these instances, the M&E fee may be computed based on or to reflect the amount that may be returned with the GMDB rider, e.g., the annual reset or the premium that has been paid with the rollup. Alternatively, the GMDB rider fee may be assessed separately.

If the individual does not accept the offer, step 110, steps 104 and 108 are repeated for subsequent individuals. If the individual accepts the offer, step 110, the variable annuity issues, step 112. The annuity may issue automatically, or at some time thereafter. After issuance, the individual's information and the annuity information are saved or stored, such as on a computer, for subsequent use, step 114. The information may be stored locally at an agent interface or remotely at a database associated with a server computer.

In one embodiment, upon issuance of the variable annuity or soon thereafter, the policy owner invests their premium in a fixed account and/or a separate account, step 116. The separate account will be used to track the annuity investments. At a predetermined time thereafter, e.g., 6 months, the fixed account and the separate investment division or account will be merged, step 118, to create a single merged annuity account having an accumulated value that tracks any portion of the premium that is invested in the fixed account and/or investment divisions. In this instance, it may be necessary to track the premium that has been paid, and withdrawals or disbursements, if any, for example, to compute or assess a premium based M&E fee.

At step 120, the time from the issuance of the variable annuity may then be tested to determine if the M&E fee and, alternatively or in addition, the fee for the GMDB rider should be assessed against the annuity owner's account or accounts, such as the fixed account, separate investment division or account, or the merged account. The M&E and GMDB fees will be assessed against the annuity account periodically, such as annually, semiannually, quarterly, etc., based on a predetermined date, such as the anniversary of the annuity. In one embodiment, the M&E fee will be assessed at the inception of variable annuity and periodically thereafter, in which instance the first M&E fee may be assessed as soon as the initial premium that has been paid is reflected in the annuity owner's account or accounts. If at step 122 the time period is not satisfied, the system will test the time period at a later date. If however the time period for assessing either fee has been satisfied, the M&E fee will be computed, step 123, and assessed against a annuity owner's account and the accumulated value reduced accordingly to reflect the assessed fee, step 124. Assessing generally entails charging or debiting an annuity account in the amount of the M&E fee or the GMDB rider fee. Once assessed, the fee may be applied to cover death benefits for variable annuities.

The following examples illustrate the methods of computing a premium based M&E fee that is based on a fixed percentage of the premium that has been paid or a portion thereof, assuming an initial investment of $10,000 and a fixed fee rate equal to a 1.70% annual charge or 0.425% quarterly charge. Example 1, after the first quarter, the premium received at the assessment date is $10,000 and assuming an upswing in the relevant markets that results in the accumulated value increasing to $12,000. A quarterly premium based M&E fee is equal to ($10,000×0.425%)=$42.50. To illustrate the various types of death benefits, the premium paid death benefit in this instance in the event the annuitant dies after the first quarter is $10,000, whereas the cash value death benefit is $12,000. Moreover, a GMBD rider may provide a greater predetermined annuity's cash value of $15,000.

Example 2, alternatively assuming a downturn in the relevant markets that results in an accumulated value of $7,500. A quarterly premium in this instance is still $42.50 because, as explained above, the premium based M&E fee is computed independent from the accumulated value in the annuity owner's account or the annuity investments, e.g., tracked in a separate investment division. In this instance, the death benefit will be $10,000 both for the premium paid and cash value death benefits.

Example 3, assuming an additional premium payment of $7,500 resulting in a total premium paid of $17,500 and an accumulated value of $22,000, the quarterly premium based M&E fee is equal to ($17,500×0.425%)=$74.38.

Example 4, assuming an annuity or annuity accumulated value of $12,500 that amounts to a $2,500 gain and a partial withdrawal or distribution of $3,500 that results in a remaining premium accounting for the partial withdrawal or distribution of $9,000. In this instance, the quarterly premium based M&E fee is ($9,000×0.425%)=$38.25.

Assuming a return of premium that has been paid death benefit with each of the above examples, it can be seen that the risk assumed by the provider is proportional to the amount of the value of the death benefit that may be returned in the event the annuitant dies. Moreover, in a declining market environment, the premium based M&E fee account value, e.g., the investment division or the accumulated value, may fall below that of the premium that has been paid, which thereby results in M&E fee that is larger than would otherwise be available with an investment account-based M&E fee.

The GMDB rider fee may be based on either the accumulated value or the value of the annuity investments, or a premium based fee based on the premium, the value of the premium that has been paid as of the assessment date, or a portion thereof, the total premium paid accounting for any withdrawals or disbursements, or the guaranteed benefit amount being provided by the rider. The GMDB rider fee assessed based on the guaranteed benefit amount advantageously stabilizes GMDB revenue that may otherwise fluctuate if assessed based on the investment account or accumulated value. While the guaranteed benefit amount as the base amount against which the charge for the rider is assessed will not eliminate the GMDB risk, the charge is proportional to the risk assumed by the provider.

Figure 2:
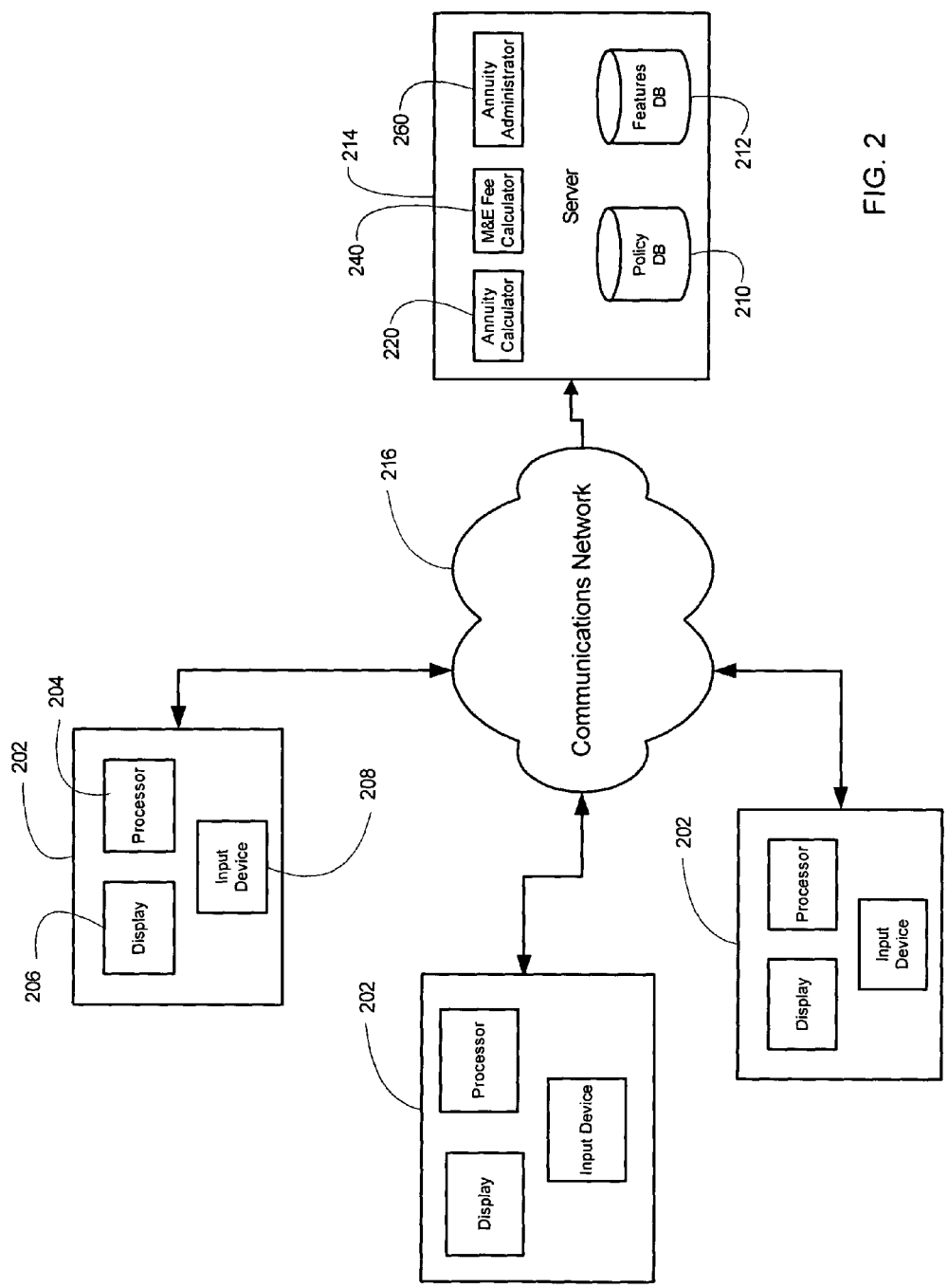
FIG. 2 is a diagram of a system useful in stabilizing revenue derived by a variable annuity provider from variable annuities according to one embodiment of the present invention.

Referring to FIG. 2, a system useful in stabilizing revenue derived by a variable annuity provider from variable annuities by providing a variable annuity having a death benefit funded with an M&E fee or fees computed based on at least one variable not directly affected by market conditions, includes a computing device, such as an agent interface 202, having a processor 204 and associated computer memory, a display device 206, and an input device 208. The agent interface 202 is at least one of a programmable calculator, or a personal computer or special purpose computer having appropriate software, such as an annuity calculator 220, M&E fee calculator 240, an annuity administrator 260, or a combination thereof, stored on a computer readable medium, such as a hard drive, magnetic disc, optical disk, etc., or otherwise designed that when executed to assist in providing and/or administering a variable annuity having a death benefit funded with M&E fees as described herein.

The annuity calculator 220 computes an annuity premium from a desired annuity payment or an annuity payment from a desired premium and the M&E fee calculator computes the M&E fee as described above. The annuity administrator provides general annuity administration functionality, including tracking an annuity payment or payments, accumulated value, premium paid, premium allocated to an investment division and a fixed account, withdrawals, disbursements, an M&E fee or fees, a GMDB, a GMDB fee or fees, etc. Each one or all of the software components may interact with each other and with the relevant database or databases to provide the respective functionality.

The software, in one embodiment, is installed or resides locally, e.g., on a computer readable medium, at the agent interface 202, thereby enabling a user, such as insurance agent, to input relevant information, such as information about the annuity owner, the amount the individual is willing to invest, premium payments, premium allocation between accounts, requests for withdrawals, the desired annuity payment, and to compute or assist in computing premium that has been paid less any withdrawals and disbursements, an accumulated value, an M&E fee, GMDB fee, etc. for the variable annuity having a death benefit funded with M&E fees as described herein. The software may be proprietary software designed to provide the methods described herein or, alternatively, standard software, such as a spreadsheet or a database program, adopted to perform the same.

In an alternative embodiment, the agent interface 202 is communicatively connected to at least one server 214 or any other type of host computer over a communications network 216, such as a local area network (LAN), a wide area network (WAN), the Internet, the World Wide to Web (WWW), a wireless network, or a combination thereof. In one embodiment, the server includes an annuity calculator 220, an M&E fee calculator 240, an annuity administrator 260, or a combination thereof. In another embodiment, the server 214 includes at least one database, such as an annuity database 210, and/or an annuity features database 212. The annuity database 210 generally includes information regarding issued and non-issued annuities, such as a annuitants' personal data, coverage limitations, relevant dates, data for computing an M&E fee, including the premium, premium that has been paid, balance of the premium paid accounting for or less withdrawals or disbursements, premium allocation, etc., data related to applicable riders or options, etc. The features database 212 includes data necessary for computing or otherwise determining the premium for the variable annuity, the rate at which the M&E fee will be assessed, rider charges, information related to variable annuity features, rider benefits and features, etc.

In one embodiment, the agent interface 202 accesses the relevant database or databases for the relevant information for providing the variable annuity having a death benefit funded with an M&E fee or fees as described herein to compute, assist in computing or otherwise determining the premium that has been paid, a balance of the premium paid accounting for withdrawals and disbursements, premium allocations, the M&E fee, the GMDB fee, etc., and may update the relevant databases accordingly. Alternatively, the agent interface 202 may transmit data to the server 214 and the server 214, equipped with appropriate software to perform the back end functionality, including performing the appropriate computations and communicating data to the agent interface 202, causing the agent interface 202 to display information, such as information related to the premium or fees.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method for offering variable annuities, the method comprising:
    electronically receiving, via a processing device, a plurality of individual information for providing a variable annuity with a guaranteed minimum death benefit, the individual information including an age of an individual, an annuity payment commencement date, an annuity payment time period, and an initial investment amount;
    electronically calculating, via the processing device, a premium payment for the variable annuity for the individual, the premium payment calculated using at least the individual information;
    electronically generating, via the processing device, the variable annuity with the guaranteed minimum death benefit for the individual;
    upon acceptance by the individual, electronically issuing, via the processing device, the variable annuity with the guaranteed minimum death benefit;
    electronically calculating, via a processing device, the guaranteed minimum death benefit based at least on payment of one or more premiums by the individual;
    electronically calculating, via a processing device, with a mortality and expense fee computed for a plurality of periods based on at least one variable based on comprising a risk posed by the guaranteed minimum death benefit and the payment of one or more premiums by the individual, wherein the at least one variable has a value that is independent of a value of investments associated with in the variable annuity, wherein the mortality and expense fee is used to fund, at least in part, the risk associated with the guaranteed minimum death benefit of the variable annuity;
    electronically generating, via the processing device, the variable annuity with the guaranteed minimum death benefit for the individual; and
    upon acceptance by the individual, electronically issuing, via the processing device, the variable annuity with the guaranteed minimum death benefit.

2. The method of claim 1, wherein the guaranteed minimum death benefit provides a return of premium payments that have been paid or an annuity's cash value if the annuity's cash value is greater than the premium payments that have been paid, in the event the individual dies before commencement of annuity payments.

3. The method of claim 2, further comprising offering a guaranteed minimum death benefit rider providing a death benefit selected from a group consisting of an annual reset, the greater of an annual reset, the premium payments that have been paid, and an annuity's cash value.

4. The method of claim 1, wherein the age of the individual is the age at a date of an offering of the variable annuity.

5. The method of claim 1, wherein the age of the individual is the age at a payout date of the variable annuity.

6. The method of claim 1, wherein the at least one variable includes a life expectancy of the individual.

7. The method of claim 1, wherein the at least one variable includes a gender of the individual.

8. A system for offering variable annuities, the system comprising:
    computer readable medium having executable instructions stored thereon; and
    a computing device including a processor, in operative communication with the computer readable medium such that the computing device receives the executable instructions therefrom and the computing device, in response to the executable instructions, operative to:
    receive a plurality of individual information for providing a variable annuity with a guaranteed minimum death benefit, the individual information including an age of an individual, an annuity payment commencement date, an annuity payment time period, and an initial investment amount;
    calculate a premium payment for the variable annuity for the individual, the premium payment calculated using at least the individual information;
    generate the variable annuity with the guaranteed minimum death benefit for the individual;
    upon acceptance by the individual, issue the variable annuity with the guaranteed minimum death benefit;
    calculate the guaranteed minimum death benefit based at least on payment of one or more premiums by the individual;
    calculate a mortality and expense fee for a plurality of periods based on at least one variable comprising a risk posed by the guaranteed minimum death benefit and the payment of one or more premiums by the individual, wherein the at least one variable has a value that is independent of a value of investments in the variable annuity, wherein the mortality and expense fee is used to fund, at least in part, the risk associated with the guaranteed minimum death benefit of the variable annuity.

9. The system of claim 8, wherein the guaranteed minimum death benefit provides a return of premium payments that have been paid or an annuity's cash value if the annuity's cash value is greater than the premium payments that have been paid, in the event the individual dies before commencement of annuity payments.

10. The system of claim 9, the processor further operative to offer a guaranteed minimum death benefit rider providing a death benefit selected from a group consisting of an annual reset, the greater of an annual reset, the premium payments that have been paid, and an annuity's cash value.

11. The system of claim 8, wherein the age of the individual is the age at a date of an offering of the variable annuity.

12. The system of claim 8, wherein the age of the individual is the age at a payout date of the variable annuity.

13. The system of claim 8, wherein the at least one variable includes a life expectancy of the individual.

14. The system of claim 8, wherein the at least one variable includes a gender of the individual.

* * * * *

UNITED STATES PATENT AND TRADEMARK OFFICE
CERTIFICATE OF CORRECTION

PATENT NO.        : 8,666,783 B1                                   Page 1 of 1
APPLICATION NO.   : 10/661346
DATED             : March 4, 2014
INVENTOR(S)       : Meyer It is certified that error appears in the above-identified patent and that said Letters Patent is hereby corrected as shown below:

In the Claims

Claim 1, Column 9, line 36 - delete "with".
Claim 1, Column 9, line 37 - delete "computed".
Claim 1, Column 9, line 38 - delete "based on".
Claim 1, Column 9, line 43 - delete "in".
Claim 8, Column 10, line 39 - replace "in" with -- associated with --.

Signed and Sealed this
Twenty-second Day of July, 2014

Michelle K. Lee
*Deputy Director of the United States Patent and Trademark Office*